United States Patent
Okato et al.

(10) Patent No.: US 10,797,316 B2
(45) Date of Patent: *Oct. 6, 2020

(54) COATED NICKEL HYDROXIDE POWDER FOR ALKALI SECONDARY BATTERY POSITIVE ELECTRODE ACTIVE MATERIAL AND METHOD OF PRODUCING SAME

(71) Applicant: SUMITOMO METAL MINING CO., LTD., Tokyo (JP)

(72) Inventors: Kazuaki Okato, Ehime (JP); Tomomichi Nihei, Ehime (JP); Hideo Sasaoka, Ehime (JP)

(73) Assignee: Sumitomo Metal Mining Co., Ltd., Tokyo (JP)

( * ) Notice: Subject to any disclaimer, the term of this patent is extended or adjusted under 35 U.S.C. 154(b) by 515 days.

This patent is subject to a terminal disclaimer.

(21) Appl. No.: 14/443,929

(22) PCT Filed: Oct. 24, 2013

(86) PCT No.: PCT/JP2013/078883
§ 371 (c)(1),
(2) Date: May 19, 2015

(87) PCT Pub. No.: WO2014/080720
PCT Pub. Date: May 30, 2014

(65) Prior Publication Data
US 2015/0311523 A1    Oct. 29, 2015

(30) Foreign Application Priority Data

Nov. 20, 2012   (JP) .................. 2012-254507

(51) Int. Cl.
| | |
|---|---|
| H01M 4/52 | (2010.01) |
| H01M 4/32 | (2006.01) |
| H01M 4/36 | (2006.01) |
| C01G 53/04 | (2006.01) |

(52) U.S. Cl.
CPC ............. *H01M 4/52* (2013.01); *C01G 53/04* (2013.01); *H01M 4/32* (2013.01); *H01M 4/366* (2013.01); *C01P 2002/50* (2013.01); *C01P 2004/80* (2013.01)

(58) Field of Classification Search
CPC .... H01M 4/366; H01M 4/40402; H01M 4/26; H01M 4/32; H01M 4/52; H01M 10/30; H01M 2004/028; Y02E 60/124
USPC ....................... 429/223; 427/126.6
See application file for complete search history.

(56) References Cited

U.S. PATENT DOCUMENTS

| | | | | |
|---|---|---|---|---|
| 5,180,574 A | * | 1/1993 | Von Sacken | C01B 6/246 423/594.4 |
| 6,358,648 B2 | | 3/2002 | Hayashi et al. | |
| 6,800,396 B1 | * | 10/2004 | Stoller | H01M 4/52 423/142 |
| 2004/0209166 A1 | * | 10/2004 | Kihara | C01B 3/0057 429/218.2 |

FOREIGN PATENT DOCUMENTS

| | | | |
|---|---|---|---|
| CN | 101106193 | | 1/2008 |
| JP | 63152866 | | 6/1988 |
| JP | 07133115 | | 5/1995 |
| JP | 07245104 | | 9/1995 |
| JP | 9147857 | | 6/1997 |
| JP | 09147857 A | * | 6/1997 |
| JP | 09147857 A | * | 6/1997 |
| JP | 10012237 | | 1/1998 |
| JP | 2000149941 | | 5/2000 |

OTHER PUBLICATIONS

Machine Translation in English of JP 09-147857.*
Machine Translation and Abstract in English of JP-09147857. (Year: 2019).*
English Abstract of JP 63152866.
English Abstract of JP 07133115.
English Abstract of JP 2000149941.
English Abstract of JP 07245104.
English Abstract of JP 10012237.
English Abstract of JP 9147857.
English Abstract of CN101106193.

* cited by examiner

*Primary Examiner* — Stewart A Fraser
*Assistant Examiner* — Claire L Roe
(74) *Attorney, Agent, or Firm* — Dykema Gossett PLLC

(57) ABSTRACT

A coated nickel hydroxide powder that has improved dispersibility in a paste to inhibit agglomeration and can be densely packed in a three-dimensional metal porous body in the preparation of a positive electrode for alkaline secondary battery includes nickel hydroxide particles and a coating layer made of a cobalt compound and formed on a surface of the nickel hydroxide particles, wherein when 10 mL of water is added to 10 g of the coated nickel hydroxide powder to prepare a suspension, a total amount of eluted ions except for oxonium ions, hydroxide ions, and carbonate ions in the suspension is 6.5 mmol/L or less. The coated nickel hydroxide powder obtained through a crystallization step, a coating step, and a washing step is dried in a drying step in a decarbonated atmosphere whose partial pressure of a carbon-containing gas is 15 Pa or less.

3 Claims, No Drawings

US 10,797,316 B2

COATED NICKEL HYDROXIDE POWDER FOR ALKALI SECONDARY BATTERY POSITIVE ELECTRODE ACTIVE MATERIAL AND METHOD OF PRODUCING SAME

CROSS REFERENCE TO RELATED APPLICATIONS

This application is a United States national stage application of International application no. PCT/JP2013/078883, filed 24 Oct. 2013 (the '883 application) and published under International publication no. WO 2014/080720 A1 on 30 May 2015. This application claims the benefit of Japan application no. 2012-254507, filed 20 Nov. 2012 (the '507 application) and issues under Japan patent no. JP5842794 (B2) on 13 Jan. 2016. The '883 application and the '507 application are hereby incorporated by reference as though fully set forth herein.

TECHNICAL FIELD

The present invention relates to a nickel hydroxide powder for an alkaline secondary battery positive electrode active material and a method for producing such a nickel hydroxide powder. Particularly, the present invention relates to a nickel hydroxide powder coated with a cobalt compound to ensure conductivity between particles thereof and enhance the utilization ratio, lifetime characteristics, and output characteristics of a battery, and a method for producing such a coated nickel hydroxide powder.

BACKGROUND ART

In recent years, there has been increasing demand for secondary batteries for portable devices or hybrid cars, and such secondary batteries have been strongly required to have a higher capacity. Therefore, a nickel hydroxide powder for an alkaline secondary battery positive electrode material has been improved by forming a solid solution with cobalt to improve the utilization ratio of an alkaline secondary battery at high temperatures or by forming a solid solution with zinc or magnesium to improve the lifetime characteristics of an alkaline secondary battery.

Particularly, alkaline secondary batteries used as high-output power sources such as power sources for hybrid cars have been strongly required to have not only such improved utilization ratio at high temperatures or lifetime characteristics but also improved output characteristics. However, a nickel hydroxide powder for an alkaline secondary battery positive electrode material is an electrical insulating material and poor in conductivity, which causes a problem that an electrical current does not sufficiently run through nickel hydroxide; therefore, the electrochemical availability of nickel hydroxide is low.

In order to solve such a problem, a surface of nickel hydroxide particles is coated with a cobalt compound, such as cobalt oxide or cobalt hydroxide, as a conductive material to ensure conductivity between the nickel hydroxide particles. The cobalt compound that coats the surface of the nickel hydroxide particles develops electrical conductivity and forms a conductive network between the nickel hydroxide particles.

For example, Patent Literature 1 proposes a nickel active material for storage battery mainly including nickel hydroxide particles having a β-type cobalt hydroxide thin layer formed thereon. Patent Literature 1 states that this nickel active material is obtained by depositing nickel hydroxide particles from a nickel salt in an aqueous alkali solution, immersing the nickel hydroxide particles in an aqueous solution of cobalt sulfate or cobalt nitrate, and neutralizing the aqueous solution with an aqueous alkali solution.

Further, Patent Literature 2 describes a method for producing a nickel hydroxide powder coated with cobalt hydroxide, in which a cobalt-containing aqueous solution and an ammonium ion supplier are simultaneously, continuously, and quantitatively supplied to a nickel hydroxide powder-containing aqueous solution adjusted to pH 11 to 13 with a caustic alkali.

Further, Patent Literature 3 proposes a method in which a cobalt ion-containing aqueous solution is supplied to a suspension of a raw nickel hydroxide powder at a supply rate of 0.7 g/min or less in terms of cobalt per kilogram of the raw nickel hydroxide powder, and an ammonium ion-containing aqueous solution is supplied to the suspension to achieve a nickel ion concentration of 10 to 50 mg/L and a cobalt ion concentration of 5 to 40 mg/L while the pH, temperature, and ammonium ion concentration of the suspension are kept at predetermined values.

A positive electrode for alkaline secondary battery using the cobalt compound-coated nickel hydroxide powder described above is generally produced through the steps of mixing a nickel hydroxide powder, an organic polymer as a binder, and a solvent to prepare a paste, packing the paste in a three-dimensional metal porous body, such as foamed nickel, and subjecting the three-dimensional metal porous body to drying and pressing. However, the cobalt compound-coated nickel hydroxide powder is generally poor in dispersibility in the paste; therefore, there is a problem that the packing density of the cobalt compound-coated nickel hydroxide powder in foamed nickel or the like in the preparation of a positive electrode is reduced so that a battery using the positive electrode cannot exhibit desired battery characteristics.

In order to solve such a problem, an increase in the tap density of a nickel hydroxide powder as a core material has been studied. This is because it is generally known that when the tap density of a nickel hydroxide powder is higher, the nickel hydroxide powder can be more densely packed; therefore, the capacity of a battery is expected to increase. For example, Patent Literature 4 states that nickel hydroxide particles having an increased diameter can be crystallized out by simultaneously and continuously supplying a nickel-containing aqueous solution, an aqueous caustic alkali solution, and an ammonium ion supplier, which makes it possible to obtain a nickel hydroxide powder having a high tap density of 2.1 to 2.3 g/mL. Further, Patent Literature 5 describes a high-density nickel hydroxide powder having a tap density of 1.9 g/mL or more and an average particle size of 3 to 25 µm.

As described above, some proposals have been made to increase the tap density of a cobalt compound-coated nickel hydroxide powder to achieve high-density packing of the powder. However, there has been no proposal effective at improving the dispersibility of a cobalt compound-coated nickel hydroxide powder in a paste. Therefore, there is still a problem that the packing density of a cobalt compound-coated nickel hydroxide powder in foamed nickel or the like in positive electrode preparation has not yet reached a satisfactory level.

CITATION LIST

Patent Literatures

Patent Literature 1: JP 63-152866 A
Patent Literature 2: JP 07-133115 A

Patent Literature 3: JP 2000-149941 A
Patent Literature 4: JP 07-245104 A
Patent Literature 5: JP 10-012237 A

SUMMARY OF INVENTION

Technical Problem

In view of the above conventional problems, it is an object of the present invention to provide a coated nickel hydroxide powder that has improved dispersibility in a paste and can be densely packed in a three-dimensional metal porous body such as foamed nickel in the preparation of a positive electrode for alkaline secondary battery, and a method for producing such a coated nickel hydroxide powder.

Solution to Problem

In order to achieve the above object, the present inventors have intensively studied to find out a reason for agglomeration of a coated nickel hydroxide powder during paste preparation which causes a reduction in the dispersibility of the powder. As a result, the present inventors have found that the occurrence of agglomeration of a coated nickel hydroxide powder is greatly influenced by the amount of ions eluted when the coated nickel hydroxide powder is dispersed in water as a solvent. Further, the present inventors have found that the amount of the eluted ions is influenced by an atmosphere during drying in the process of production of the coated nickel hydroxide powder. These findings have led to the completion of the present invention.

More specifically, the present invention is directed to a coated nickel hydroxide powder for an alkaline secondary battery positive electrode active material, including: core particles made of nickel hydroxide; and a coating layer made of a cobalt compound and formed on a surface of the core particles, wherein when 10 mL of water is added to 10 g of the coated nickel hydroxide powder to prepare a suspension, a total amount of eluted ions except for oxonium ions, hydroxide ions, and carbonate ion in the suspension is 6.5 mmol/L or less.

In the coated nickel hydroxide powder for an alkaline secondary battery positive electrode active material according to the present invention, an amount of eluted sodium ions in the suspension is preferably 4.0 mmol/L or less. Further, the coated nickel hydroxide powder for an alkaline secondary battery positive electrode active material according to the present invention preferably has a sodium content of 250 ppm by mass or less.

In the coated nickel hydroxide powder for an alkaline secondary battery positive electrode active material according to the present invention, an amount of eluted sulfate ions in the suspension is preferably 1.5 mmol/L or less. Further, the coated nickel hydroxide powder for an alkaline secondary battery positive electrode active material according to the present invention preferably has a sulfate group content of 0.40 mass % or less.

In the coated nickel hydroxide powder for an alkaline secondary battery positive electrode active material according to the present invention, when 10 mL of water is added to 1 g of the coated nickel hydroxide powder to prepare a suspension and the suspension is allowed to stand for 10 minutes to obtain a supernatant, the supernatant preferably has a turbidity specified in JIS K0101 of 300 degrees or more. Further, the coated nickel hydroxide powder for an alkaline secondary battery positive electrode active material according to the present invention preferably has a total carbon content of 1000 ppm by mass or less.

The present invention is directed also to a method for producing a coated nickel hydroxide powder for an alkaline secondary battery positive electrode active material, the method including: a crystallization step in which an aqueous alkali solution is supplied to a nickel-containing aqueous solution to obtain nickel hydroxide particles crystallized out by neutralization as core particles; a coating step in which a coating layer made of a cobalt compound is formed on a surface of the core particles to obtain a coated nickel hydroxide powder; a washing step in which the coated nickel hydroxide powder is washed; and a drying step in which the coated nickel hydroxide powder after washing is dried, wherein in the drying step, the coated nickel hydroxide powder is dried in a decarbonated atmosphere whose partial pressure of a carbon-containing gas is 15 Pa or less.

Further, in the method for producing a coated nickel hydroxide powder for an alkaline secondary battery positive electrode active material according to the present invention, in the drying step, the coated nickel hydroxide powder is preferably dried in a decarbonated air atmosphere whose partial pressure of carbon dioxide is 10 Pa or less.

Advantageous Effect of Invention

According to the present invention, it is possible to inhibit the occurrence of agglomeration of a coated nickel hydroxide powder during paste preparation. Therefore, when a positive electrode for alkaline secondary battery is prepared using the coated nickel hydroxide powder according to the present invention, the coated nickel hydroxide powder can be uniformly packed in a three-dimensional metal porous body such as foamed nickel, which makes it possible to make the positive electrode high-density and improve the battery characteristics, such as discharge capacity.

DESCRIPTION OF EMBODIMENTS

An important requirement for the packing property of a coated nickel hydroxide powder in a three-dimensional metal porous body, such as foamed nickel, is the dispersibility of particles of the powder in a paste obtained by mixing the coated nickel hydroxide powder, a solvent, and an organic polymer as a binder. More specifically, when poor in dispersibility, the paste is in a state where the powder agglomerates and forms lumps. If the paste in such a state is packed in foamed nickel or the like, it is difficult to achieve uniform packing. As a result, a positive electrode for alkaline secondary battery prepared by packing the coated nickel hydroxide powder in foamed nickel or the like has a low packing density.

In general, there are various factors that influence the dispersibility of particles in a paste, such as the particle size, specific surface area, and crystallinity of the particles. However, the dispersibility of a coated nickel hydroxide powder is greatly influenced by the concentration of eluted ions. The agglomeration of a coated nickel hydroxide powder in a solvent is influenced by the electric potential, such as zeta potential, of particles of the powder, and the electric potential changes as the amount of eluted ions increases. Therefore, the agglomeration of a coated nickel hydroxide powder in a solvent used for preparing a paste can be inhibited by properly controlling the concentration of eluted ions in the solvent.

In general, a water-based paste is often used for producing an alkaline secondary battery. It has been found that the agglomeration of a coated nickel hydroxide powder in a water-based paste generally used can be inhibited by using a coated nickel hydroxide powder such that, when 10 mL of water is added to 10 g of the coated nickel hydroxide powder to prepare a suspension, the total amount of eluted ions except for oxonium ions, hydroxide ions, and carbonate ions in the suspension is 6.5 mmol/L or less. It is to be noted that oxonium ions, hydroxide ions, and carbonate ions are usually contained in a paste, and their impact on the agglomeration of particles of the powder is small.

The initial value of the total amount of eluted ions in a paste changes depending on the ratio between a coated nickel hydroxide powder and a solvent. However, when the paste has a composition within a range usually used and a coated nickel hydroxide powder whose suspension exhibits a total amount of eluted ions in the above range is used, the total amount of eluted ions in the paste becomes stable at an electrical potential at which the agglomeration of particles of the powder is inhibited; therefore, the agglomeration of the particles is inhibited and the paste can have excellent dispersibility. It is to be noted that the total amount of eluted ions in the suspension fluctuates just after the suspension is prepared, but pH becomes stable after a lapse of 1 minute or longer. Therefore, the total amount of eluted ions in the suspension of a coated nickel hydroxide powder is preferably measured after the coated nickel hydroxide powder and water are mixed and stirred for 1 minute or longer. However, the amount of eluted ions is not changed even when the stirring is performed for 10 minutes or longer; therefore, less than ten-minute stirring is enough.

In the process of production of a coated nickel hydroxide powder, a substance containing a sulfate group or sodium is often used as a raw material or additive. Further, in a crystallization step and a coating step, sodium hydroxide or sulfuric acid is often used as a pH adjuster. For this reason, as the ions eluted into a paste, sodium ions or sulfate ions tend to be eluted in a large amount; therefore, agglomeration can be effectively inhibited by reducing the amount of elution of these ions.

Therefore, the amount of sodium ions eluted in the suspension is preferably 4.0 mmol/L or less, more preferably 3.0 mmol/L or less. If the amount of eluted sodium ions exceeds 4.0 mmol/L, there is a case where the total amount of eluted ions exceeds 6.5 mmol/L so that the agglomeration of coated nickel hydroxide particles occurs when a paste is prepared.

A reduction in the sodium content of the coated nickel hydroxide powder is more effective at reducing the amount of eluted sodium ions. More specifically, the sodium content is preferably 250 ppm by mass or less. If the sodium content of the coated nickel hydroxide powder exceeds 250 ppm by mass, there is a case where the amount of eluted sodium ions in the suspension undesirably exceeds 4.0 mmol/L.

On the other hand, the amount of sulfate ions eluted in the suspension is preferably 1.5 mmol/L or less, more preferably 1.0 mmol/L or less. If the amount of eluted sulfate ions exceeds 1.5 mmol/L, there is a case where the total amount of eluted ions exceeds 6.5 mmol/L so that the agglomeration of coated nickel hydroxide particles occurs when a paste is prepared.

A reduction in the sulfate group content of the coated nickel hydroxide powder is more effective at reducing the amount of eluted sulfate ions. More specifically, the sulfate group content is preferably 0.40 mass % or less. If the sulfate group content exceeds 0.40 mass %, there is a case where the amount of eluted sulfate ions undesirably exceeds 1.5 mmol/L.

As described above, a coated nickel hydroxide powder according to the present invention preferably has a lower sodium content and a lower sulfate group content. Sodium and sulfate groups contained in the coated nickel hydroxide powder are derived from a raw material or additive. Therefore, in order to extremely reduce sodium and sulfate groups, sodium and sulfate groups need to be eliminated from a raw material or additive, or washing needs to be repeatedly performed, which is, however, industrially impractical due to a significant increase in cost. Therefore, the industrially-achievable lower limits of the sodium content and sulfate group content are about 100 ppm by mass and about 0.25 mass %, respectively.

Further, the coated nickel hydroxide powder according to the present invention preferably has a total carbon content of 1000 ppm by mass or less, more preferably 800 ppm by mass or less, even more preferably 500 ppm by mass or less. The total carbon content is mainly derived from a carbon-containing gas, such as carbon dioxide, attached to the surface of coated nickel hydroxide particles, and the carbon-containing gas is considered to have the function of promoting the elution of ions from the coated nickel hydroxide powder due to ion exchange with ions attached to the particles. Therefore, the amount of eluted ions in a paste can be reduced by reducing the amount of the carbon-containing gas attached, that is, the total carbon content, which makes it possible to inhibit the agglomeration of the coated nickel hydroxide particles.

When poor in dispersibility, particles agglomerate in a solvent; therefore, turbidity is reduced due to the high settleability of the particles. For this reason, the turbidity of the suspension is used as an indicator of agglomeration of the coated nickel hydroxide powder in a paste. It has been confirmed that when the turbidity of a suspension obtained by suspending the coated nickel hydroxide powder in water used as a solvent in paste preparation is higher, agglomeration of the coated nickel hydroxide powder in a paste is more inhibited, and the coated nickel hydroxide powder can be more uniformly packed in foamed nickel or the like; therefore, a positive electrode having a higher packing density can be obtained. More specifically, when 10 mL of water is added to 1 g of the coated nickel hydroxide powder to prepare a suspension, and the suspension is allowed to stand for 10 minutes to obtain a supernatant, the supernatant preferably has a turbidity (specified in JIS K0101) of 300 degrees or more. If the turbidity of the suspension is less than 300 degrees, the coated nickel hydroxide powder agglomerates in a paste; therefore, the packing density of a positive electrode is likely to be inadequate.

The coated nickel hydroxide powder according to the present invention is produced by a production method that will be described later so that its dispersibility in a paste is improved. Factors other than such improved dispersibility, such as the composition of nickel hydroxide constituting the core particles and the cobalt compound constituting the coating layer, and the particle size of the coated nickel hydroxide powder, may be in accordance with a conventionally-known coated nickel hydroxide powder.

The core particles of the coated nickel hydroxide powder may be nickel hydroxide particles known for an alkaline secondary battery positive electrode active material, but are particularly preferably made of nickel hydroxide represented by the following general formula: $Ni_{1-x-y}Co_xM_y(OH)_2$ (wherein x is 0.005 to 0.05, y is 0.005 to 0.05, and M is one or more of Ca, Mg, and Zn).

If x that represents a cobalt content in the above formula is less than 0.005, the effect of improving charge efficiency achieved by adding cobalt cannot be obtained. On the other hand, if x exceeds 0.05, battery performance is degraded due to a reduction in discharge voltage. If y that represents the amount of M contained as an additive element is less than 0.005, the effect of reducing a change in the volume of nickel hydroxide during discharge and charge achieved by adding the element M cannot be obtained. On the other hand, if y exceeds 0.05, the effect of reducing a change in the volume of nickel hydroxide can be obtained, but beyond that, a reduction in battery capacity is caused so that battery performance is undesirably degraded.

The cobalt compound that coats the surface of the nickel hydroxide particles of the coated nickel hydroxide powder is preferably cobalt hydroxide, cobalt oxyhydroxide, or a mixture thereof. By coating the nickel hydroxide particles with such a cobalt compound, electrical conductivity is developed between the particles; therefore, the electrochemical availability of nickel hydroxide can be increased.

The amount of cobalt contained in the coating layer of the coated nickel hydroxide powder is preferably in the range of 3 to 7 mass % with respect to the total mass of the nickel hydroxide particles as core particles and the coating layer. If the amount of cobalt contained in the coating layer is less than 3 mass %, the amount of the cobalt compound constituting the coating layer is insufficient, and the effect of coating a surface of the cobalt hydroxide particles is not sufficiently obtained. On the other hand, if the amount of cobalt contained in the coating layer exceeds 7 mass %, the amount of the cobalt compound constituting the coating layer is increased, but the coating effect is not further enhanced.

Further, the average particle size, that is, the median diameter at 50% cumulative volume of the coated nickel hydroxide powder as measured by a laser diffraction scattering method is preferably 5 to 15 µm, more preferably 6 to 12 µm. If the average diameter is less than 5 µm, there is a case where the packing density of the coated nickel hydroxide powder in a positive electrode is reduced. If the average diameter exceeds 15 µm, there is a case where the electrochemical availability of nickel hydroxide in a battery is reduced.

Hereinbelow, a method for producing a coated nickel hydroxide powder for an alkaline secondary battery positive electrode active material according to the present invention will be described. The method for producing a coated nickel hydroxide powder according to the present invention includes: a crystallization step in which an aqueous alkali solution is supplied to a nickel-containing aqueous solution to obtain nickel hydroxide particles crystallized out by neutralization as core particles; a coating step in which a coating layer made of a cobalt compound is formed on a surface of the core particles to obtain a coated nickel hydroxide powder; a washing step in which the coated nickel hydroxide powder is washed; and a drying step in which the coated nickel hydroxide powder after washing is dried.

The nickel-containing aqueous solution used in the crystallization step is preferably an aqueous nickel sulfate solution to prevent impurity incorporation. When an additive element is added to improve battery characteristics, an aqueous solution containing the additive element may be mixed with the nickel-containing aqueous solution. From the viewpoint of inhibiting impurity incorporation and cost, the aqueous alkali solution used is preferably an aqueous sodium hydroxide solution.

In the crystallization step, the aqueous solution containing an ammonium ion supplier can be further added to form an ammine complex during a neutralization reaction to stabilize the neutralization reaction and to improve the powder characteristics, such as particle size distribution and density, of nickel hydroxide particles to be crystallized out. The ammonium ion supplier is not particularly limited as long as a nickel ammine complex can be formed in an aqueous reaction solution. Examples of such an ammonium ion supplier include ammonia, ammonium sulfate, ammonium chloride, ammonium carbonate, and ammonium fluoride. Among them, ammonia is preferably used.

The amount of ammonia added as the ammonium ion supplier is not particularly limited as long as it is enough to form a complex by binding with a metal ion such as a nickel ion in an aqueous reaction solution; therefore, the concentration of ammonia in the aqueous reaction solution is preferably 5 to 20 g/L, more preferably 8 to 15 g/L. If the concentration of ammonia in the aqueous reaction solution is less than 5 g/L, the nickel hydroxide particles may have a wide particle size distribution or have too small a particle size due to the low solubility of the metal ion that forms a complex. On the other hand, if the concentration of ammonia in the aqueous reaction solution exceeds 20 g/L, there is a case where nickel remains in the liquid component of a slurry due to too high solubility of the metal ion; therefore, the loss of raw materials is large. Further, when an additive element is added, there is a case where the composition ratio between nickel and the additive element shifts.

The pH of the aqueous reaction solution during crystallization caused by neutralization is preferably controlled to be kept in the range of 10 to 13, more preferably 10.5 to 12.5 as measured at 25° C. If the pH is less than 10, particles having a large particle size are easily obtained, but there is a case where nickel remains in the liquid component of a slurry after crystallization. If the pH exceeds 13, the crystallization rate of nickel hydroxide is too high, which is not preferred because many microparticles of nickel hydroxide are formed or the nickel hydroxide particles have an undesirable particle size distribution.

In the crystallization step, the aqueous alkali solution and the aqueous solution containing an ammonium ion supplier may be added to the nickel-containing aqueous solution at a time. However, in order to obtain nickel hydroxide particles having excellent powder characteristics, the nickel-containing aqueous solution, the aqueous alkali solution, and the aqueous solution containing an ammonium ion supplier are preferably supplied to a liquid, in which a reaction is proceeding, little by little to cause crystallization by neutralization. A mixture of the nickel-containing aqueous solution and the aqueous solution containing an ammonium ion supplier may be added, but there is a case where nickel hydroxide particles are generated in the mixture due to an increase in pH. For this reason, the nickel-containing aqueous solution, the aqueous solution containing an ammonium ion supplier, and the aqueous alkali solution are preferably individually supplied to a liquid in which a reaction is proceeding.

As a device used in the crystallization step, a commonly-used crystallization reaction tank can be used. The reaction tank used may be of either continuous or batch type. The reaction tank used is preferably equipped with a stirring device so that a homogeneous reaction can be performed. Further, the reaction tank used preferably includes the capability of temperature control because temperature control is preferably performed to stabilize a neutralization reaction. Further, a nickel hydroxide powder obtained in the crystallization step is preferably washed with water to reduce impurities contained therein. This makes it possible to reduce the total amount of ions eluted from a coated nickel hydroxide powder finally obtained.

In the next coating step, a coating layer made of a cobalt compound is formed on the surface of particles of the nickel hydroxide powder obtained in the crystallization step. More specifically, an aqueous cobalt salt solution and an aqueous alkali solution are supplied to a stirred slurry of the nickel hydroxide powder as core particles while the pH of the slurry is kept in the range of 8 to 11.5 as measured at 25° C. so that the surface of the nickel hydroxide particles is coated with cobalt hydroxide crystallized out by neutralization. In this way, a coated nickel hydroxide powder is obtained whose particle surface is coated with cobalt hydroxide.

The pH of the slurry is preferably kept in the range of 8 to 11.5, more preferably 9.5 to 10.5 as measured at 25° C. If the pH of the slurry is less than 8, the deposition rate of cobalt hydroxide is too low; therefore, productivity is reduced. On the other hand, if the pH of the slurry exceeds 11.5, there is a case where generated cobalt hydroxide is likely to gelate; therefore, it may be difficult to form an excellent coating. It is to be noted that the pH of the slurry of the nickel hydroxide powder is preferably adjusted to a value in the above range with an inorganic acid including a cation contained in a cobalt salt supplied so as not to exceed 11.5.

Further, the pH of the slurry is preferably kept at a certain value in the range of 8 to 11.5 as measured at 25° C. and controlled so that its fluctuation range is within ±0.2. If the fluctuation range of the pH exceeds the above limit, there is a fear that the amount of a cobalt hydroxide coating varies. It is to be noted that the pH of the slurry is continuously measured with, for example, a pH controller using a glass electrode method, and the flow rate of the aqueous alkali solution supplied is preferably continuously feedback-controlled with the pH controller so that the pH is kept constant in the above fluctuation range.

In the coating step, when a region of high cobalt salt concentration is formed or a rapid increase in pH occurs in a portion where the aqueous cobalt salt solution is supplied to the slurry, cobalt hydroxide is likely to be deposited alone. As a result, cobalt hydroxide is started to be deposited alone even when the nickel hydroxide particles are not present near the cobalt hydroxide; therefore, cobalt hydroxide poor in adhesiveness and uniformity is likely to be deposited on the surface of the nickel hydroxide particles. In order to inhibit this, the deposition of cobalt hydroxide alone is preferably inhibited by appropriately adjusting the stirring conditions of the slurry or adjusting the distance between a supply port for the aqueous cobalt salt solution and a supply port for the aqueous alkali solution.

The concentration of nickel hydroxide in the slurry is preferably in the range of 400 to 1200 g/L. If the concentration of nickel hydroxide is less than 400 g/L, there is a case where cobalt hydroxide is deposited alone in the slurry due to the shortage of surface active sites of the nickel hydroxide particles where deposition of cobalt hydroxide occurs. On the other hand, if the concentration of nickel hydroxide exceeds 1200 g/L, there is a case where the slurry cannot be sufficiently stirred due to an increase in viscosity so that a cobalt hydroxide coating is non-uniformly formed.

The cobalt salt is not particularly limited as long as the cobalt salt is a water-soluble cobalt compound from which cobalt hydroxide is generated by pH control. More specifically, the cobalt salt is preferably cobalt sulfate or cobalt chloride, and is more preferably cobalt sulfate not contaminated with halogens. The alkali is not particularly limited, but is preferably water-soluble sodium hydroxide or potassium hydroxide. From the viewpoint of cost, sodium hydroxide is particularly preferred.

The temperature of the slurry is preferably in the range of 30 to 60° C. before and after the aqueous cobalt salt solution and the aqueous alkali solution are added. If the temperature of the slurry is less than 30° C., cobalt hydroxide is slowly deposited due to a low reaction rate. On the other hand, if the temperature of the slurry exceeds 60° C., cobalt hydroxide is likely to be non-uniformly deposited on the surface of the nickel hydroxide particles due to too high a reaction rate. Further, the temperature of the slurry is preferably kept at a certain value within the above temperature range and controlled so that its fluctuation range is within ±1° C. If the fluctuation range of the temperature of the slurry exceeds the above limit, there is a fear that the concentration of impurities in deposited cobalt hydroxide varies so that a battery using a resulting coated nickel hydroxide powder does not have stable characteristics.

In the coating step, a coated nickel hydroxide powder is obtained whose particles have a uniform cobalt hydroxide coating layer tightly adhering to the surface thereof. Further, after the surface of particles of the nickel hydroxide powder is coated with cobalt hydroxide in the slurry in the coating step, cobalt hydroxide constituting the coating layer may be oxidized to cobalt oxyhydroxide by supplying air or oxygen to the stirred slurry or adding an oxidizer.

The oxidation of the cobalt hydroxide coating layer and the coating of the nickel hydroxide particles with cobalt hydroxide may be continuously performed. For example, a first reaction tank (coating tank) in which coating of the nickel hydroxide particles with cobalt hydroxide is performed and a second reaction tank (oxidation tank) in which oxidation of cobalt hydroxide is performed are cascaded, and the slurry containing the coated nickel hydroxide powder coated with cobalt hydroxide in the first reaction tank (coating tank) is continuously supplied to the second reaction tank (oxidation tank) to oxidize cobalt hydroxide so that nickel hydroxide particles coated with cobalt oxyhydroxide can be obtained.

The coated nickel hydroxide powder obtained in the coating step is washed in the next washing step to remove sodium or sulfate groups contained in the coated nickel hydroxide powder. This makes it possible to reduce the total amount of ions except for oxonium ions, hydroxide ions, and carbonate ions eluted into a suspension obtained by adding 10 mL of water to 10 g of the coated nickel hydroxide powder.

In the washing step, the coated nickel hydroxide powder is preferably washed with water in an amount of 4 times by mass or more, more preferably 5 times by mass or more the amount of the coated nickel hydroxide powder. By washing the coated nickel hydroxide powder with water in an amount of 4 times by mass or more the amount of the coated nickel hydroxide powder, the amount of the impurities, such as sodium ions and sulfate groups, contained in the coated nickel hydroxide powder can be sufficiently reduced; therefore, the total amount of eluted ions can be reduced. There is no upper limit on the amount of water used for washing performed only for the purpose of reducing the impurity content or the total amount of eluted ions. However, it is useless to use a large amount of water for washing; therefore, from a practical viewpoint, the amount of water used for washing is 15 times by mass or less the amount of the coated nickel hydroxide powder. Further, assuming that the amount of water used for washing is the same, washing is preferably performed two or more times from the viewpoint of effectiveness. However, if the amount of water is less than 4 times by mass the amount of the coated nickel hydroxide powder, there is a case where the total amount of eluted ions cannot be reduced.

Further, when an aqueous solution containing an ammonium ion supplier is used in the crystallization step, the ammonium ion supplier added remains as ammonia in the nickel hydroxide powder, and is then oxidized to a nitrogen oxide by drying after washing; therefore, the nitrogen oxide is eluted as nitrate ions or nitrite ions into a suspension of the coated nickel hydroxide powder. Therefore, there is a case where when 10 mL of water is added to 10 g of the coated nickel hydroxide powder to prepare a suspension, the total amount of ions expect for oxonium ions, hydroxide ions, and carbonate ions eluted into the suspension increases and exceeds 6.5 mmol/L.

In this case, the coated nickel hydroxide powder obtained in the coating step is preferably washed in the washing step until the amount of ammonium ions eluted into a suspension obtained by adding 10 ml of water to 10 g of the coated nickel hydroxide powder after washing becomes 0.4 mmol/L or less. By washing the coated nickel hydroxide powder until the amount of eluted ammonium ions becomes 0.4 mmol/L or less, the total amount of ions eluted into a suspension obtained by adding 10 mL of water to 10 g of the coated nickel hydroxide powder can be sufficiently reduced.

The amount of eluted ammonium ions is determined for the coated nickel hydroxide powder; therefore, when the coated nickel hydroxide powder in a wet state is evaluated, the amount of eluted ammonium ions can be accurately measured by adjusting the amount of water added based on the previously-determined water content of the coated nickel hydroxide powder in a wet state. When the coated nickel hydroxide powder in a wet state is once dried, drying may be performed under conditions where ammonia is not chemically changed and the ammonia content of the coated nickel hydroxide powder is not changed, for example, in an inert atmosphere at a temperature of about 30° C.

In the washing step, ammonia contained in the coated nickel hydroxide powder before the drying step may be reduced so that the amount of eluted ammonium ions is in the above range. Ammonia contained in the coated nickel hydroxide powder is derived from the ammonium ion supplier used in the crystallization step; therefore, the amount of ammonia contained in the coated nickel hydroxide powder can be reduced to control the amount of eluted ammonium ions also by sufficiently washing the nickel hydroxide powder as core particles to remove ammonia.

On the other hand, it is considered that ammonium ions present near the surface of particles of the coated nickel hydroxide powder are oxidized in the drying step, which influences the total amount of eluted ions. Therefore, from the viewpoint of efficiency, ammonium ions present near the surface of particles of the coated nickel hydroxide powder are preferably removed by washing after the coating step. Further, also when an ammonium ion supplier is used in the coating step, ammonium ions present near the surface of particles of the coated nickel hydroxide powder are preferably removed by washing after the coating step.

A washing method is not particularly limited as long as impurities such as ammonium ions or sodium ions can be removed. Examples of such a washing method include batch repulp washing using a stirring tank in which washing water is stirred, washing with water passed through a filter press, or continuous washing using a rotary filter.

Then, the coated nickel hydroxide powder in a wet state after washing is dried in the drying step to obtain a coated nickel hydroxide powder. In the drying step, drying is performed in a decarbonated atmosphere whose partial pressure of a carbon-containing gas is 15 Pa or less. This makes it possible to reduce the total amount of eluted ions except for oxonium ions, hydroxide ions, and carbonate ions in a suspension obtained by adding 10 mL of water to 10 g of the coated nickel hydroxide powder to 6.5 mmol/L or less.

A carbon-containing gas present in an atmosphere during drying is considered to have the function of promoting the elution of ions from the coated nickel hydroxide powder due to ion exchange with impurity ions such as sodium ions or sulfate ions attached to the coated nickel hydroxide powder. Therefore, the ion exchange can be inhibited by performing drying in a decarbonated atmosphere whose partial pressure of a carbon-containing gas is 15 Pa or less, which makes it possible to control the total amount of eluted ions in a suspension of the coated nickel hydroxide powder to be 6.5 mmol/L or less.

The atmosphere during drying may generally be a non-reducible atmosphere. For example, an inert gas atmosphere or an air atmosphere is used. From the viewpoint of handleability and cost, an air atmosphere subjected to decarbonation treatment is preferred. Examples of the carbon-containing gas include carbon dioxide, carbon monoxide, and hydrocarbon. However, most of a carbon-containing gas contained in an air atmosphere is occupied by carbon dioxide; therefore, the partial pressure of carbon dioxide in a decarbonated air atmosphere is preferably 10 Pa or less, more preferably 5 Pa or less. If the partial pressure of carbon dioxide exceeds 10 Pa, there is a case where the partial pressure of a carbon-containing gas in the air atmosphere exceeds 15 Pa.

The coated nickel hydroxide powder obtained by the production method according to the present invention is excellent in particle dispersibility; therefore, the occurrence of agglomeration during paste preparation can be inhibited. Thus, the coated nickel hydroxide powder can be uniformly packed in a three-dimensional metal porous body such as foamed nickel in the preparation of a positive electrode for alkaline secondary battery; therefore, a positive electrode having a high packing density can be obtained, which is extremely effective at improving the battery characteristics, such as discharge capacity, of an alkaline secondary battery.

EXAMPLES

Hereinbelow, the present invention will be described in more detail with reference to Examples and Comparative Example. It is to be noted that in Examples and Comparative Example, cations in a suspension were analyzed by ICP atomic emission spectrometry, and anions were analyzed by ion chromatography. Further, a total carbon content was analyzed by a combustion-infrared absorption method. The turbidity of a suspension was measured in the following manner. Ten milliliters of water was added to 1 g of a coated nickel hydroxide powder to prepare a suspension, and the suspension was allowed to stand for 10 minutes to obtain a supernatant. Then, the turbidity of the supernatant was measured by a method specified in JIS K0101 using kaolin as a reference substance.

Example 1

(Crystallization Step)
Nickel sulfate hexahydrate for industrial use of 134.3 kg, cobalt sulfate heptahydrate for industrial use of 4.6 kg, and magnesium sulfate of 4.0 kg were dissolved in water to prepare a nickel-containing aqueous solution whose total volume was adjusted to 300 L. Further, 100 L of a 48 mass % sodium hydroxide solution for industrial use was diluted with water to prepare an aqueous sodium hydroxide solution having a total volume of 200 L.

Then, a reaction tank having a capacity to overflow of 9 L was filled with water, and was then placed in a constant temperature water bath so that the temperature of the water was adjusted to and kept at 50° C. Further, the nickel-containing aqueous solution and a 25 mass % ammonia water for industrial use were continuously supplied into the reaction tank while the water in the reaction tank was stirred, and the pH (as measured at 25° C.) of a reaction liquid in the reaction tank was controlled to be 11.8 with the sodium hydroxide solution using a pH controller.

The reaction liquid in the reaction tank was kept stirred until the pH, temperature, ammonium ion concentration, and slurry concentration of the reaction liquid reached certain values, and then a product was collected through an overflow. The collected product was washed with water to remove attached impurities such as anions to obtain a nickel hydroxide powder $(Ni_{0.94}Co_{0.03}Mg_{0.03}(OH)_2)$ as core particles.

(Coating Step)

The obtained nickel hydroxide powder was dispersed in water to obtain a nickel hydroxide slurry containing nickel hydroxide particles at a solid content concentration of 1000 g/L. Further, 4.8 kg of cobalt sulfate heptahydrate for industrial use was dissolved in water to obtain an aqueous cobalt sulfate solution whose total volume was adjusted to 10 L.

The obtained nickel hydroxide slurry was transferred to a reaction tank for coating, and then the reaction tank was placed in a constant temperature water bath so that the temperature of the nickel hydroxide slurry was adjusted to and kept at 50° C. Then, the aqueous cobalt sulfate solution was added to the stirred nickel hydroxide slurry in the reaction tank at 80 mL/min. Further, the aqueous sodium hydroxide solution was supplied to the nickel hydroxide slurry to adjust the pH of the nickel hydroxide slurry to 10.0 as measured at 25° C. Here, the pH of the slurry in the reaction tank was measured with a pH electrode and controlled by adjusting the supply flow rate of the aqueous sodium hydroxide solution using a pH controller. It is to be noted that the accuracy of pH control using the pH controller was ±0.1.

After all the aqueous cobalt sulfate solution was dropped, the pH of the slurry was adjusted to 9.5 as measured at 25° C. Further, air was blown into the stirred slurry from the bottom of the reaction tank for 4 hours to oxidize cobalt hydroxide deposited on the surface of the nickel hydroxide particles to cobalt oxyhydroxide. During the oxidation reaction, the temperature of the slurry in the reaction tank was kept at 50±0.5° C. The slurry after the reaction was subjected to solid-liquid separation, and as a result, 52.0 kg of a nickel hydroxide powder coated with cobalt oxyhydroxide was obtained.

(Washing Step and Drying Step)

The obtained cobalt oxyhydroxide-coated nickel hydroxide powder in a wet state was subjected to repulp washing by 3 repeated cycles of washing performed by dispersion in 100 L of water and filtration. Then, solid-liquid separation was performed, and the cobalt oxyhydroxide-coated nickel hydroxide powder in a wet state was dried for 15 hours using a vacuum drier set at 105° C. to obtain a cobalt oxyhydroxide-coated nickel hydroxide powder. During the vacuum drying, a decarbonated air atmosphere was kept by eliminating carbon dioxide from an air atmosphere so that the partial pressure of carbon dioxide was reduced to 10 Pa.

Ten milliliters of water was added to 10 g of the obtained cobalt oxyhydroxide-coated nickel hydroxide powder, and the powder was dispersed in the water by stirring for 5 minutes to prepare a suspension. The total amount of ions except for oxonium ions, hydroxide ions, and carbonate ions eluted into the suspension was 2.3 mmol/L. Further, the amount of eluted sodium ions was 2.0 mmol/L, and the amount of eluted sulfate ions was 0.07 mmol/L. Further, the turbidity of a suspension of the cobalt oxyhydroxide-coated nickel hydroxide powder was measured as an indicator of agglomeration of particles of the powder and was found to be 512 degrees (kaolin).

Further, the sodium content, sulfate group content, and total carbon content of the obtained cobalt oxyhydroxide-coated nickel hydroxide powder were 190 ppm by mass, 0.32 mass %, and 280 ppm by mass, respectively. Some of the measurement results are shown in the following Table 1.

Example 2

A cobalt oxyhydroxide-coated nickel hydroxide powder was obtained in the same manner as in Example 1 except that in the drying step, drying was performed for 15 hours in a decarbonated air atmosphere whose partial pressure of carbon dioxide was 5 Pa with the use of a stationary drier set at 105° C.

The total amount of eluted ions in a suspension of the obtained cobalt oxyhydroxide-coated nickel hydroxide powder was 2.2 mmol/L. Further, the amount of eluted sodium ions was 1.9 mmol/L, and the amount of eluted sulfate ions was 0.08 mmol/L. The turbidity of a suspension of the cobalt oxyhydroxide-coated nickel hydroxide powder was 499 degrees (kaolin).

Further, the total carbon content of the obtained cobalt oxyhydroxide-coated nickel hydroxide powder was 200 ppm. The measurement results are shown in the following Table 1.

Comparative Example 1

A cobalt oxyhydroxide-coated nickel hydroxide powder was obtained in the same manner as in Example 1 except that in the drying step, drying was performed for 15 hours in a decarbonated air atmosphere whose partial pressure of carbon dioxide was 20 Pa with the use of a stationary drier set at 105° C.

The total amount of eluted ions in a suspension of the obtained cobalt oxyhydroxide-coated nickel hydroxide powder was 7.9 mmol/L. Further, the amount of eluted sodium ions was 4.7 mmol/L, and the amount of eluted sulfate ions was 1.8 mmol/L. The turbidity of a suspension of the cobalt oxyhydroxide-coated nickel hydroxide powder was 144 degrees (kaolin).

Further, the obtained cobalt oxyhydroxide-coated nickel hydroxide powder had a total carbon content of 1200 ppm. The measurement results are shown in the following Table 1.

Comparative Example 2

A cobalt oxyhydroxide-coated nickel hydroxide powder was obtained in the same manner as in Example 1 except that in the drying step, drying was performed for 15 hours in a non-decarbonated air atmosphere with the use of a stationary drier set at 80° C.

The total amount of eluted ions in a suspension of the obtained cobalt oxyhydroxide-coated nickel hydroxide powder was 6.8 mmol/L. Further, the amount of eluted sodium ions was 4.3 mmol/L, and the amount of eluted sulfate ions was 1.1 mmol/L. The turbidity of a suspension of the cobalt oxyhydroxide-coated nickel hydroxide powder was 217 degrees (kaolin).

Further, the total carbon content of the obtained cobalt oxyhydroxide-coated nickel hydroxide powder was 1100 ppm. The measurement results are shown in the following Table 1.

Comparative Example 3

A cobalt oxyhydroxide-coated nickel hydroxide powder was obtained in the same manner as in Example 1 except that in the drying step, drying was performed for 15 hours in a non-decarbonated air atmosphere with the use of a stationary drier set at 140° C.

The total amount of eluted ions in a suspension of the obtained cobalt oxyhydroxide-coated nickel hydroxide powder was 8.6 mmol/L. Further, the amount of eluted sodium ions was 4.5 mmol/L, and the amount of eluted sulfate ions was 2.4 mmol/L. The turbidity of a suspension of the cobalt oxyhydroxide-coated nickel hydroxide powder was 150 degrees (kaolin).

Further, the total carbon content of the obtained cobalt oxyhydroxide-coated nickel hydroxide powder was 1200 ppm. The measurement results are shown in the following Table 1.

TABLE 1

|  | Amount of Ions Eluted from Suspension (mmol/l) | | | Turbidity | Total Carbon Content |
| --- | --- | --- | --- | --- | --- |
|  | All Ions | Na Ions | Sulfate Ions | degrees (kaolin) | (ppm by mass) |
| Example 1 | 2.3 | 2.0 | 0.07 | 512 | 280 |
| Example 2 | 2.2 | 1.9 | 0.08 | 499 | 200 |
| Comparative Example 1 | 7.9 | 4.7 | 1.8 | 144 | 1200 |
| Comparative Example 2 | 6.8 | 4.3 | 1.1 | 217 | 1100 |
| Comparative Example 3 | 8.6 | 4.5 | 2.4 | 150 | 1200 |

As can be seen from the above Table 1, the turbidity is obviously lower, that is, agglomeration of the cobalt oxyhydroxide-coated nickel hydroxide powder is more likely to occur in Comparative Examples 1, 2, and 3 than in Examples 1 and 2. The results of Examples and Comparative Examples show that agglomeration of the coated nickel hydroxide powder during paste preparation can be inhibited by reducing the total amount of ions, especially sodium ions and sulfate ions that are eluted at a high rate, eluted into a suspension of the coated nickel hydroxide powder, which makes it possible to improve the packing property of the coated nickel hydroxide powder in foamed nickel or the like.

The invention claimed is:

1. A method for producing a coated nickel hydroxide powder having a total carbon content of 1000 ppm by mass or less for an alkaline secondary battery positive electrode active material, the method comprising:
    a crystallization step in which an aqueous alkali solution is supplied to a nickel-containing aqueous solution to obtain nickel hydroxide particles crystallized out by neutralization as core particles;
    a coating step in which a coating layer consisting of a cobalt compound is formed on a surface of the core particles to obtain a coated nickel hydroxide powder;
    a washing step in which the coated nickel hydroxide powder is washed; and
    a drying step in which the coated nickel hydroxide powder after washing is dried,
    wherein in the drying step, the coated nickel hydroxide powder is dried in a decarbonated air atmosphere whose partial pressure of a carbon-containing gas is 15 Pa or less.

2. The method for producing a coated nickel hydroxide powder for an alkaline secondary battery positive electrode active material according to claim 1, wherein in the drying step, the coated nickel hydroxide powder is dried in a decarbonated air atmosphere whose partial pressure of carbon dioxide is 10 Pa or less.

3. The method for producing a coated nickel hydroxide powder according to claim 1, wherein the drying step is carried out at about 105° C.

* * * * *